Feb. 17, 1959 P. KLEPARCHUK 2,873,795
DEVICE FOR THE REMOVAL OF TIRES AND KING PINS
Filed April 11, 1956 4 Sheets-Sheet 1

Inventor
Peter Kleparchuk
by Stevens, Davis, Miller & Mosher
his Attorneys

Feb. 17, 1959  P. KLEPARCHUK  2,873,795
DEVICE FOR THE REMOVAL OF TIRES AND KING PINS
Filed April 11, 1956  4 Sheets-Sheet 2
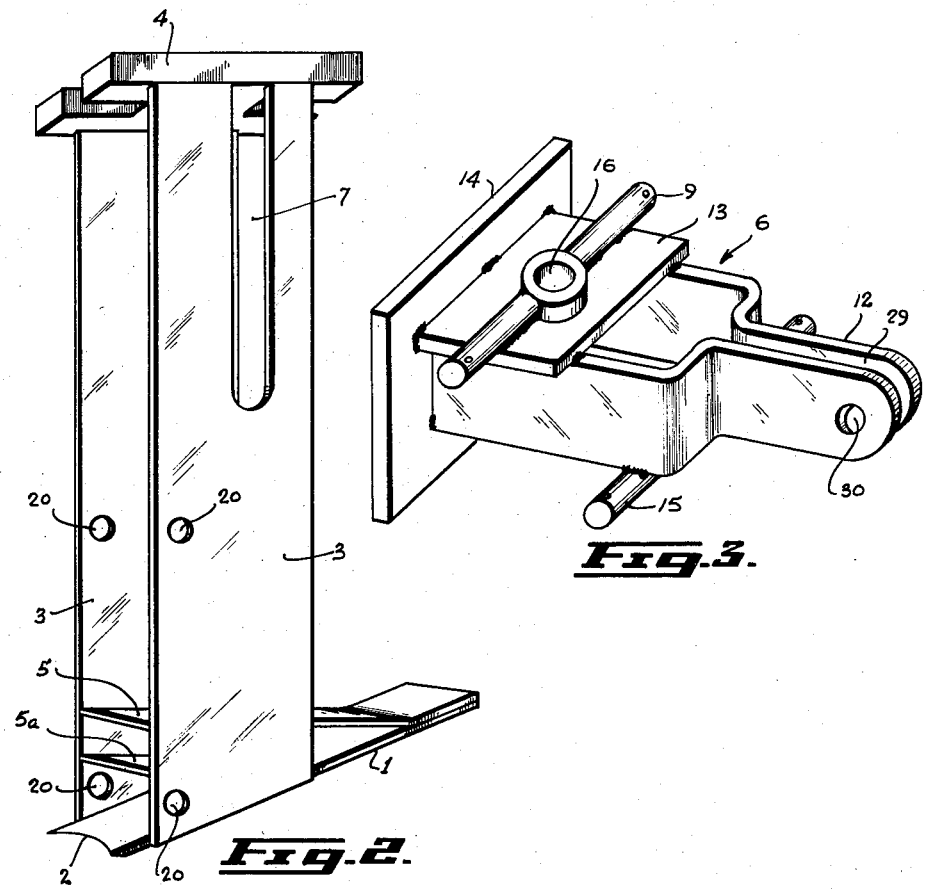
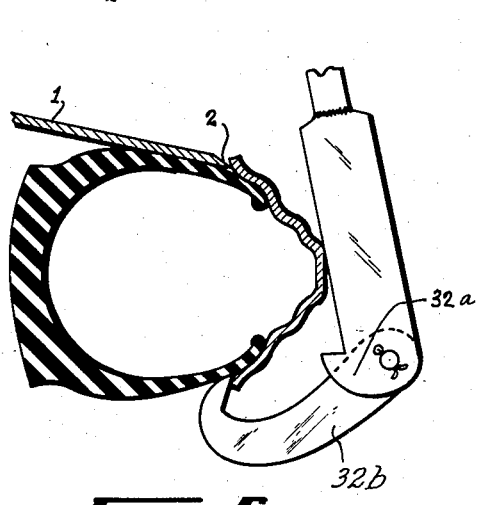
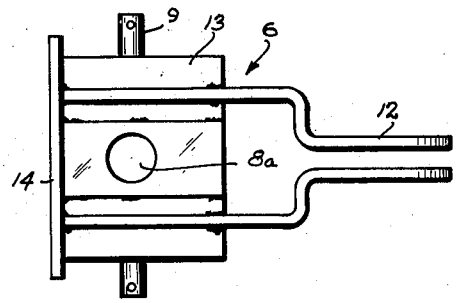

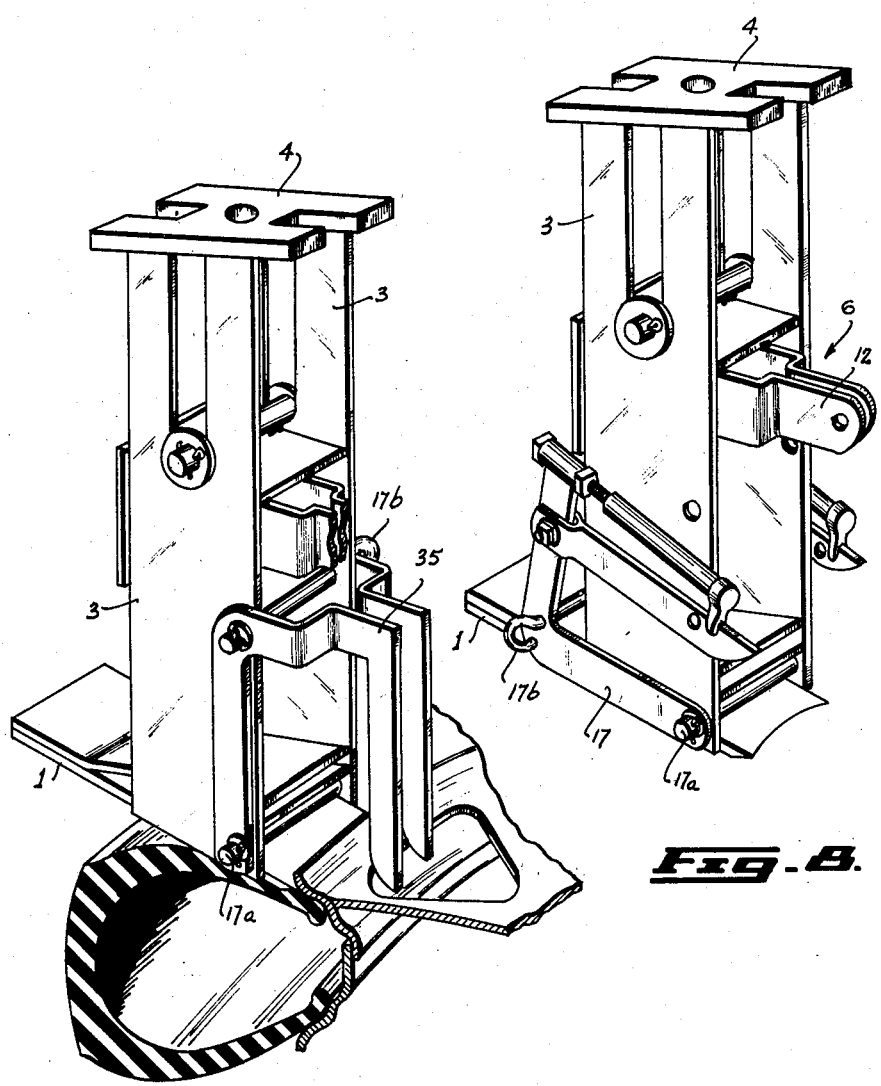

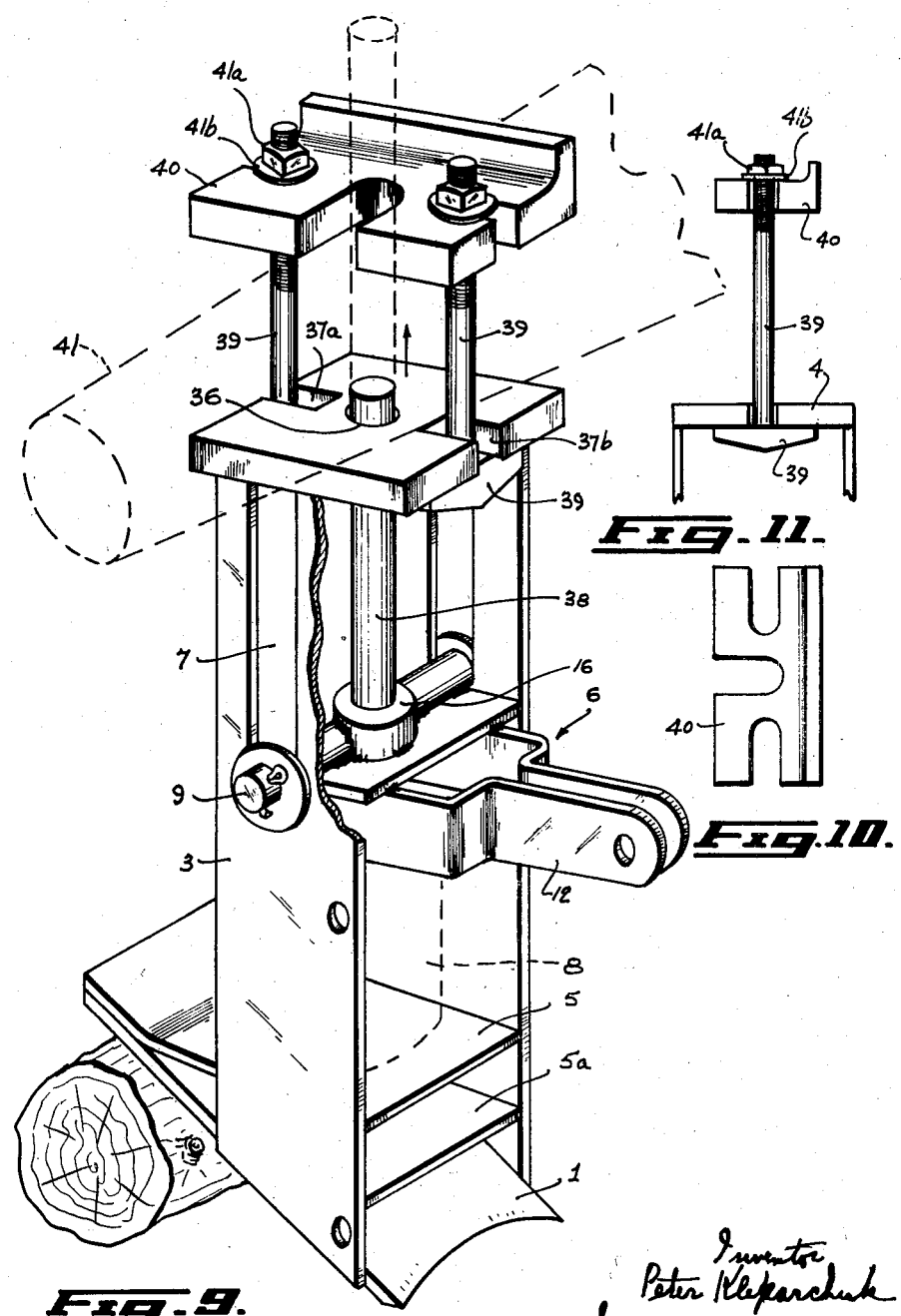

United States Patent Office 2,873,795
Patented Feb. 17, 1959

2,873,795

DEVICE FOR THE REMOVAL OF TIRES AND KING PINS

Peter Kleparchuk, Lamont, Alberta, Canada

Application April 11, 1956, Serial No. 577,477

Claims priority, application Canada February 28, 1956

4 Claims. (Cl. 157—1.17)

This invention relates to a machine for removing tires from heavy automotive machinery, such as trucks, buses and the like and which may also be conveniently adapted for the removal of king pins therefrom.

Tire removers are, of course, in existence at the present time, but it may be said from experience that these have not proved very satisfactory or reliable, especially when applied to the tires of heavy vehicles. Tire removers presently in use are, in fact, not constructed with sufficient strength and in a suitable manner to bear the strain and stress which is applied thereto during the removal operation of a particularly heavy tire. A disadvantage with the use of previously known tire removers is that it is necessary to repeat the tire removing operation on several areas of each side of the wheel until a sufficient perimetral portion of the wheel has been removed therefrom readily to effectuate the separation of the wheel from the tire.

Indeed, the operation of removing heavy tires with previously known devices may be considered a cumbersome and time-consuming task. Additionally, none of the prior known devices are adaptable for use as automobile king pin removers.

The present method and procedure of removing a king pin is either by means of a hammer and punch or, alternatively, another form of king pin remover may be employed. The old form of king pin remover is somewhat unreliable and, whereas it may serve its purpose when new, its usefulness deteriorates as soon as the thread thereon becomes worn. The present invention, as adapted for removing king pins, has no loose ends or weak points which may easily break and, additionally, it is easy to handle.

The need for the provision of a combined portable tire and king pin remover which is reliable and easy to operate and which is at the same time inexpensive to manufacture is clearly apparent.

Therefore, one of the main objects of the present invention is to fill this need.

Among further objects are simplicity in construction and greater effectiveness in use than the devices heretofore employed.

The embodiments of the invention will now be described with respect to the accompanying drawings in which:

Figure 2 is a perspective view of the main body portion of the device.

Figure 3 is an enlarged view showing the vertically slidable platform.

Figure 4 is a bottom view of the vertically slidable platform illustrating the circular housing which receives the top of the jack.

Figure 5 illustrates the use of the additional hook in removing a one-piece rim.

Figure 7 is a view showing the use of the offset clamps.

Figure 8 shows the device assembled in convenient carrying position.

Figure 9 shows the invention adapted for and in position for removing a king pin.

Figure 10 is a plan view of the top clamp used in the king pin removal operation.

Figure 11 is a view showing the T-shaped clamps in position as used in the operation of king pin removal.

Figures 1, 6:
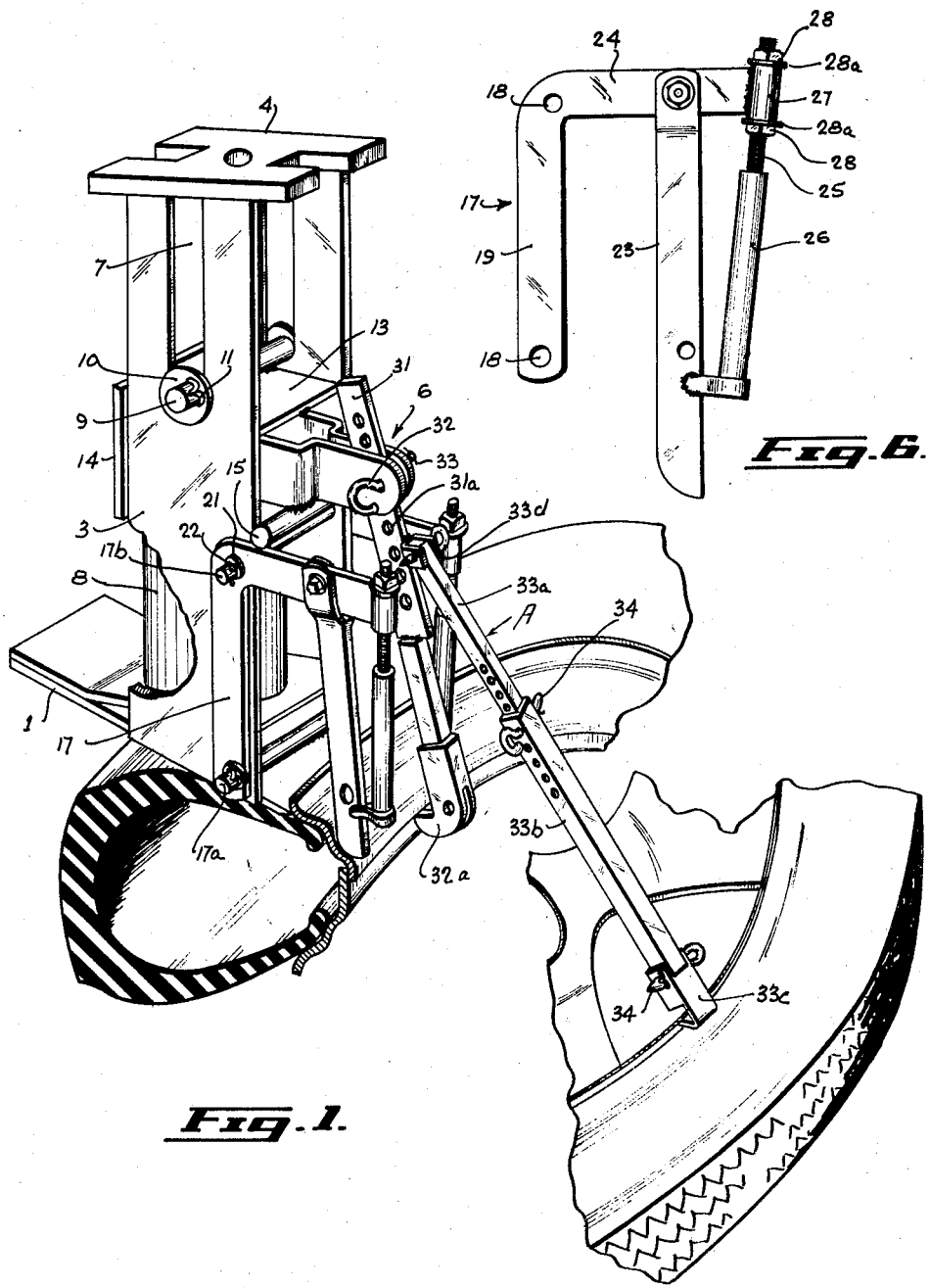
Figure 1 is a perspective view showing the device in position for removing a tire.
Figure 6 is an enlarged view of one of the adjustable clamps.

According to the present invention a tool for removing a tire from a wheel in the horizontal position, said tire in that position of the wheel being located between an upper rim and a lower rim of the wheel comprises a base having a front portion adapted to face towards the hub of the wheel and to be inserted between the tire and the upper rim and a rear portion, an inclined platform provided on said base sloping upwardly towards the front portion, two sloping supports extending upwardly from said base at right angles to the plane of said platform, a movable member adapted to reciprocate longitudinally between said supports, guide means for maintaining said member between said supports, a first linkage terminating in a hook-like structure and adapted to connect said movable member to the lower rim immediately opposite that portion of the upper rim with which said front portion co-operates; arms carried by the tool and adapted to depend into perimetral openings in the wheel structure, and means for urging said arms outwardly towards the rims to effect a clamping of the tool, the arrangement being adapted for the positioning of a jacking means between said platform and said movable member.

Referring now more particularly to the drawings the main body of the device comprises a base plate 1 having an arcuately shaped tapered lip 2 formed at the end thereof. Integral with, and extending upwardly from said base 1 are slotted sides 3 which are inclined at an angle from said base 1 and terminate with a top portion 4. The top 4 is shaped for use in connection with the removal of king pins and will therefore be discussed later herein. A platform 5, which is also integral with said base 1, is disposed at an angle between said sides 3 and is integral therewith. Since the edges of tires are usually arcuate in shape, the platform 5 is disposed at this particular angle so that when the device is in its operating position, the platform 5 provides a flat and level base on which the jacking means may rest. A second strengthening platform 5a is disposed at a similar angle below said platform 5. The main body of the device is clearly illustrated in Figure 2 of the drawings.

A substantially horizontally extending platform assembly is designated generally at 6 and is slidably mounted in the slots 7 and is vertically movable within the sides 3 when pressure from the hydraulic jack 8 is applied thereto. It should be understood that many types of jacking means may be used with the present device but that a hydraulic jack is preferable since it is quicker, more dependable and more powerful than other types of jacks. The platform assembly 6 is more particularly illustrated in Figure 3 of the drawings. The ends of the rod 9 are disposed within the slots 7 in such a manner that there is a slight degree of play between the inside of the holding washers 10 and the sides 3 so insuring that the platform assembly 6 is freely and vertically slidable. Suitable holding pins 11 are secured at each end of the rod 9. The platform assembly 6 also comprises spaced holding arms 12 which are integrally secured beneath an upper plate 13. The end plate 14 and the pin 15 rest firmly against the edges of the sides 3 thereby preventing the free rotation of the assembly 6 and maintaining said assembly in a position freely to slide within the slots 7. An additional purpose of the plate 14 and the pin 15 is to assist in maintaining the device in an erect position when pressure is applied by the jack 8 during the removal operation.

Figure 4 illustrates a small housing 8a formed in the underside of the plate 13 which housing receives and helps to maintain the top of the jack in position during the removal operation. It will be seen from Figure 3 that a circular bushing 16 extends from the upper side of the plate 13.

A substantially U-shaped adjustable holding clamp 17, which is shown more clearly in Figure 6 of the drawings, is detachably secured to each of the sides 3 by means of securing pins 17a and 17b which extend through apertures 18 formed in the portions 19 of both of said clamps and through apertures 20 in each of said sides 3. The pins 17a and 17b may be secured in any suitable manner to facilitate quick dismantling as, for example, with the washers 21 and the cotter pins 22 shown in Figure 1. The arm 23 of said clamps 17 may be pivotally secured to arm 24 in any suitable manner said clamps 17 being made adjustable so that a firm grip may be taken on the wheel rim during the tire removing operation. The adjustability of said clamps 17 is effected by means of the threaded bolt 25 which is secured within the sleeve 26 and which passes through the apertured portion 27 of said arm 24. By manipulation of the nuts 28 and the washers 28a the arm 23 may be adjusted and the distance between the portion 19 and the arm 23 altered in accordance with the particular dimensions of the rim of the wheel. The perimetral openings of the hub assemblies in some wheels are not wide enough to receive the adjustable clamps 17 which are shown in Figure 1 of the drawings, and it is therefore necessary to apply the alternative offset clamps 35 shown in Figure 7 of the drawings. The offset clamps 35 shown in Figure 7 are not illustrated as being adjustable, but it should be understood that these may be made adjustable in similar manner to the adjustable clamps 17. It should be noted that the clamps 17 may preferably be constructed of half-inch iron in order to bear the strain brought about by the jacking means during the operation of the device.

It will be seen that the faces 29 of said holding arms 12 are spaced apart and have apertures 30 formed therein. A downwardly extending holding arm 31 is detachably secured between the faces 29 of said arms 13 by means of a suitable bolt 32 and cotter pin 33. The arm 31 is provided with a series of apertures 31a and the extremity of the downward extension of said arm 31 may be determined by selecting any one of said apertures 31a and securing the bolt 32 therethrough in the manner illustrated in the accompanying drawings. The lower extremity of said arm 31 is shaped so as to provide a hooked portion 32a for attachment to the wheel rim during the tire removal operation. The use of the hook 32a may be best seen from Figure 1 of the drawings. It should be understood, however, that the hooked portion 32a may only be effectively used in the removal of tires having what are commonly known in the art as "split rim." In removing a tire not having a split rim a further hook 32b is pivotally secured on to the end of said hook portion 32a. In this way the additional hook 32b extends underneath the rim and hooks thereon in the maner illustrated in Figure 5 of the drawings.

The reason for the particular shape of the arm 31, with its straight narrow central portion which flares and terminates in the hook 32a, is to facilitate the operation of the device when used on wheels whose central hub portion provides only small perimetral openings. In such an instance the arm 31 may be inserted sidewardly into such small openings and then turned so that the hook 32a is facing the outside of the wheel and in position for securing to the wheel rim.

A further holding arm designated generally as A is pivotally secured to said arm 31 by means of a substantially U-shaped bracket 33d, the lower extremity of said arm A being hooked on to the perimeter of the wheel rim opposite the position of the main body of the device during tire removal operation, as is best illustrated in Figure 1 of the drawings. The solid apertured portion 33a of said arm A is telescoped within a hollow portion 33b and an additional fixture 33c is clamped round the end of said portion 33b. The arm A and the portions 33b and 33c have apertures formed therein so that, by lining up selected apertures therein and inserting the pins 34 therethrough the arm 33 may be adjusted as to length.

In the actual operation of removing a tire with the present invention the object is to apply mechanical force to the tire with a counter force to the tire rim thereby effecting separation of said rim and said tire and causing the removal of said tire. The base plate 1 rests on the top of the tire as can be seen in Figure 1 of the drawings and the tapered lip 2 is first tucked between the rim and the tire itself. It has been found that a convenient way of doing this, especially when removing very heavy tires, is first to use a conventional hammer and blunt chisel and prepare a way for the lip 2 by loosening that particular area of rim and tire between which it will be tucked. This simple expedient dispenses with the necesssity of heavy hammering on the back edge of the base plate 1 in order to force the lip 2 into place and consequently avoids possible damage to the device through hammering.

The adjustable clamps 17 may then be adjusted so that they bear against the inner periphery of the wheel rim and hold the device firmly in position thereon. The arm 31 is then adjusted as to length so that the hooked portion 32a is secured to the lower rim in the manner illustrated herein. If the wheel is one not having a split rim, the additional hook 32b will be added and secured in similar fashion. The holding arm A, which extends across the diameter of the hub assembly of the wheel, may be adjusted and secured to that portion of the rim immediately opposite the position of the main assembly of the device, as can be seen more clearly in Figure 1 of the drawings. The hydraulic jack 8 is then placed on the base plate 1 and is manoeuvred into position so that the top thereof is received and held in position by the housing 8a.

The hydraulic jack 8 may then be operated and, in so doing, the platform assembly 6 is forced upwardly while downwardly directed pressure is brought to bear on the edge of the tire. Since the arm 31 with its hook 32a are also secured to the platform assembly 6 upwardly directed pressure is also brought to bear on the lower rim of the wheel. A certain amount of upwardly directed pressure is also brought to bear on the arm A and, consequently, that portion of the rim to which it is secured, but the arm A also assists in holding the device in erect operating position. As more pressure is applied by the jack 8, the base 1 presses further down inside the tire-bearing portion of the rim and, in co-operation with the upwardly directed pressure on the wheel rim itself, the tire is eventually broken from the top rim of the wheel. It may happen that some tires are found more difficult to remove than others and that after the platform assembly 6 has reached the extremity of its slidable movement within said slots 7 which is, in fact, the upper termination of the slotted sides 3, the tire still has not been broken away. In this event, it is merely necessary to release the pressure on the jack 8, readjust the arm 31 so that the hook 32a is firmly re-hooked to the lower rim, and then repeat the jacking operation. This procedure may be repeated until the tire is eventually broken away.

Having broken the tire away from one side of the rim the wheel is turned over and the same operation is repeated as has been hereinbefore described until the other side of the tire has been broken away from the rim.

After completing these two operations the remaining task of manually removing the tire from the wheel is quite simple.

It can be seen that only two main operations are necessary in removing large tires and the practice of breaking a large tire away from its rim, portion by portion, and the accompanying time-consuming readjusting of the clamping and jacking means may be dispensed with.

After the tire removing operation has been completed the device may quickly be disassembled by simply removing the various cotter pins which hold the various component parts of the device in position. The device may then be assembled in convenient carrying position in which the clamps 17 are secured horizontally. In this way there are no loose ends to fall off and cause injury to the operator. The carrying position of the device is shown in Figure 8 of the drawings.

Additionally, the present invention may conveniently and quickly be adapted to remove king pins from heavy automotive equipment by the application of mechanical force from below said king pins forcing them upwards and out. A simple mechanical king pin removal device is therefore provided by adapting the present invention, which will avoid damage to axles and wheels resultant from the former method of hammering out the king pins.

The above-mentioned adaptation is effected by removing certain parts from the main body of the invention and adding others thereto.

The adjustable arms and the adjustable clamps are not required in the actual king pin removal operation so that these may be removed leaving only the main body portion, the platform assembly 6 and the jack 8 of the device as it was used in the tire removal operation. The top portion 4, which has been referred to earlier herein, has a substantially centrally disposed aperture 36 formed therein and slots 37a and 37b which extend from the sides of said top 4.

In removing a king pin the first step is the raising of the vehicle to the appropriate height so that the device may be placed thereunder. In order to ensure that the platform 5 forms a level base on which to rest the hydraulic jack 8 a piece of wood or other object may be placed under the base plate 1 as shown in Figure 9 of the drawings.

A substantially circular bar 38 is inserted through the aperture 36 and is received within the bushing 16. A pair of T-shaped clamping members 39 which pass at either side of the vehicle axle are then engaged within the slots 37a and 37b, the cross portion of said members 39 resting against the underside of said top 4 as can be seen from Figure 9 of the drawings. A top co-operating bar 40 which has a substantially centrally disposed slot and end slots formed therein rests on the upper side of the axle 41 and the clamps 39, which are threaded at their ends, are then brought into the position shown in Figure 9 of the drawings. A plan view of the top bar 40 is shown in Figure 10 of the drawings. In other words, the straight portions of said clamping members 39 are slipped into the small slots formed in the bar 40 and by means of suitable nuts and washers 41a and 41b respectively, are bolted across the top of the axle 41.

It is then important to insure that the aperture 36 is disposed immediately below the king pin and that the bar 38, which rests within said aperture 36, is aligned therewith.

When the hydraulic jack 8 is brought into operation, the platform assembly 6 is raised and since the bar 38 rests within the bushing 16 on the upper side of said assembly 6, the bar 38 is in turn forced upwards within the aperture 36. As the jacking action is continued, the bar 38 eventually enters the king pin housing and comes into contact with the bottom of the king pin and as the jacking pressure progresses, the king pin is eventually forced out of its housing in the axle and through the centrally disposed slot in said top bar 40.

The dual-purpose device hereinbefore described is clearly needed by all garages throughout the country and would doubtless prove a benefit to the vehicle owning public as a whole.

I claim:

1. A tool for removing a tire from a wheel laid in the horizontal position, said tire, in that position of the wheel, being located between an upper rim and a lower rim of the wheel, comprising a base having a front portion adapted to face towards the hub of the wheel and to be inserted between the tire and the upper rim and a rear portion, an inclined platform provided on said base sloping upwardly towards the front portion, two sloping supports extending upwardly from said base at right angles to the plane of said platform, a movable member adapted to reciprocate longitudinally between said supports, guide means for maintaining said member between said supports, a first linkage terminating in a hook-like structure and adapted to connect said movable member to the lower rim immediately opposite that portion of the upper rim with which said front portion co-operates; arms carried by the tool and adapted to depend into perimetral openings in the wheel structure, and means for urging said arms outwardly towards the rims to effect a clamping of the tool, the arrangement being adapted for the positioning of a jacking means between said platform and said movable member.

2. A tool as claimed in claim 1 in which a second linkage is detachably connected at one end to said movable member and at the other end thereof to the edge of said upper rim at a point diametrically opposite from that engaged by the front portion of the base.

3. A tool as claimed in claim 1, said movable member having a rod integral therewith, said guide means comprising slots formed in said support, said rod being adapted to be disposed within said slots.

4. A tool as claimed in claim 1 in which said movable member comprises a first plate within said supports, a rod integral with the upper side thereof, a pair of spaced holding arms extending outwardly from said first plate and integral with the underside thereof, a pin also being integral with the underside of said first plate for co-operation with the front edges of said supports; and a second plate substantially perpendicular to said first plate, the inner side of said second plate engaging with the rear edges of said supports.

References Cited in the file of this patent

UNITED STATES PATENTS

| | | |
|---|---|---|
| 1,475,519 | Snider | Nov. 27, 1923 |
| 1,899,351 | Overfelt | Feb. 28, 1933 |
| 1,983,608 | Hand | Dec. 11, 1934 |
| 2,161,227 | Houston | June 6, 1939 |
| 2,548,033 | Madden | Apr. 10, 1951 |
| 2,575,330 | Carlson | Nov. 20, 1951 |
| 2,621,715 | Lien et al. | Dec. 16, 1952 |
| 2,678,089 | Grant | May 11, 1954 |
| 2,679,896 | Branick | June 1, 1954 |